United States Patent
Yoshida et al.

(10) Patent No.: US 10,120,452 B2
(45) Date of Patent: Nov. 6, 2018

(54) INFORMATION PROCESSING APPARATUS FOR RECOGNIZING OPERATION INPUT BY GESTURE OF OBJECT AND CONTROL METHOD THEREOF

(71) Applicant: CANON KABUSHIKI KAISHA, Tokyo (JP)

(72) Inventors: Masafumi Yoshida, Ashigarakami-gun (JP); Motoki Nakama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 14/990,634

(22) Filed: Jan. 7, 2016

(65) Prior Publication Data
US 2016/0202768 A1 Jul. 14, 2016

(30) Foreign Application Priority Data
Jan. 9, 2015 (JP) .................................. 2015-003236

(51) Int. Cl.
G06F 3/01 (2006.01)
G06F 3/041 (2006.01)

(52) U.S. Cl.
CPC .............. G06F 3/017 (2013.01); G06F 3/041 (2013.01); *G06F 2203/04101* (2013.01)

(58) Field of Classification Search
CPC combination set(s) only.
See application file for complete search history.

(56) References Cited

U.S. PATENT DOCUMENTS

| | | | |
|---|---|---|---|
| 2012/0120002 A1* | 5/2012 | Ota | G06F 3/0488 345/173 |
| 2012/0162105 A1* | 6/2012 | Sakurai | G06F 3/0488 345/173 |
| 2014/0204018 A1* | 7/2014 | Murase | G06F 3/0425 345/156 |
| 2015/0062027 A1* | 3/2015 | Yang | G06F 3/0488 345/173 |
| 2015/0227203 A1* | 8/2015 | Chen | G06F 3/016 345/173 |
| 2016/0124514 A1* | 5/2016 | Cha | G06F 3/017 715/767 |
| 2017/0308235 A1* | 10/2017 | Hsu | G06F 3/04842 |

FOREIGN PATENT DOCUMENTS

JP 2012-104102 A 5/2012
JP 2012133729 A 7/2012

* cited by examiner

*Primary Examiner* — Jennifer Mehmood
*Assistant Examiner* — Deeprose Subedi
(74) *Attorney, Agent, or Firm* — Canon U.S.A., Inc. IP Division (57) ABSTRACT

An information processing apparatus includes an obtainment unit configured to obtain information indicating a proximity state of an object and a predetermined operation surface, a setting unit configured to set a condition regarding the proximity state for determining whether the object is released from the operation surface based on a moving speed of the object in a period during which the object is regarded as touching the operation surface for input by the information obtained by the obtainment unit, and a determination unit configured to determine that the object is released from the operation surface in response to that the information obtained by the obtainment unit satisfies the condition set by the setting unit.

14 Claims, 10 Drawing Sheets

| SPEED [mm/msec] | THRESHOLD VALUE FOR DETERMINING RELEASE |
|---|---|
| 0 OR MORE AND LESS THAN 0.5 | 20 |
| 0.5 OR MORE AND LESS THAN 1 | 30 |
| 1 OR MORE AND LESS THAN 2 | 40 |
| 2 OR MORE | 50 |

| SPEED [mm/msec] | THRESHOLD VALUE FOR DETERMINING RELEASE |
|---|---|
| 0 OR MORE AND LESS THAN 0.5 | 20 |
| 0.5 OR MORE AND LESS THAN 1 | 30 |
| 1 OR MORE AND LESS THAN 2 | 40 |
| 2 OR MORE | 50 |

FIG.5B

| DIRECTION | THRESHOLD VALUE FOR DETERMINING RELEASE |
|---|---|
| FORWARD DIRECTION | 20 |
| BACKWARD DIRECTION | 10 |

FIG.5C

| TOTAL MOVING DISTANCE [mm] | THRESHOLD VALUE FOR DETERMINING RELEASE |
|---|---|
| 0 OR MORE AND LESS THAN 10 | 20 |
| 10 OR MORE AND LESS THAN 100 | 30 |
| 100 OR MORE AND LESS THAN 200 | 40 |
| 200 OR MORE | 50 |

FIG.5D

| TOUCHED TIME LENGTH [msec] | THRESHOLD VALUE FOR DETERMINING RELEASE |
|---|---|
| 0 OR MORE AND LESS THAN 10 | 20 |
| 10 OR MORE AND LESS THAN 20 | 30 |
| 20 OR MORE AND LESS THAN 40 | 40 |
| 40 OR MORE | 50 |

INFORMATION PROCESSING APPARATUS FOR RECOGNIZING OPERATION INPUT BY GESTURE OF OBJECT AND CONTROL METHOD THEREOF

BACKGROUND OF THE INVENTION

Field of the Invention

The present disclosure generally relates to information processing and, more particularly, to an information processing apparatus for recognizing operation input by gesture of an object, a control method, a storage medium, and a technique for recognizing a touch operation performed by a predetermined object based on a proximity state of the object and a touch target surface.

Description of the Related Art

Recently, there are some occasions in which user interfaces (hereinbelow, UI) are projected on arbitrary operation surfaces such as walls and tables by projection, and touch operations are performed on the projected UIs. In addition, touch operations are performed in some cases on operation surfaces (virtual surfaces) which do not physically exist in environments such as an augmented reality (AR) and a mixed reality (MR). In such cases, a distance between an operation surface and an object (for example, a fingertip of a user) which is an object to be used for performing operations is obtained using a stereo camera, a range image sensor, and the like, and it is often determined whether these two are close enough to be regarded as coming into contact with each other based on a magnitude of the distance. More specifically, a predetermined threshold value is set to a distance between the operation surface and a fingertip of a user. When the distance is smaller than the threshold value, it is determined as a "touched state" indicating that the operation surface is touched with the fingertip, and when the distance is larger than the threshold value, it is determined as a "non-touched state (released state)" indicating that the operation surface is not touched therewith. Different threshold values may be used in these two types of determination. When distance resolution obtained or calculated from the stereo camera or the range image sensor is low, determination of a touch operation using the stereo camera or the range image sensor causes an error in detection of the distance between the operation surface and the fingertip. Thus, even if a user intends to continue the touch operation, the detected distance exceeds the threshold value, and it is erroneously detected as released in some cases.

In an electrostatic capacitance type touch panel which determines touch and release by setting a threshold value on a change amount of capacitance generated when a user touches a surface of the touch panel with his/her finger, the release not intended by the user may be detected due to a detection error in capacitance. According to Japanese Patent Application Laid-Open No. 2012-133729, a user sets a reference (hereinbelow, referred to as a touch panel sensitivity) to determine touch and release by himself/herself. Thus, when an operation intended by the user is not recognized, the user can adjust the touch panel sensitivity to change "easiness in recognition" of operations and suppress malfunctions.

According to the conventional technique described in Japanese Patent Application Laid-Open No. 2012-133729, a user needs to manually set the touch panel sensitivity one by one to determine touch and release.

SUMMARY OF THE INVENTION

According to an aspect of the present disclosure, an information processing apparatus includes an obtainment unit configured to obtain information indicating a proximity state of an object and a predetermined operation surface, a setting unit configured to set a condition regarding the proximity state for determining whether the object is released from the operation surface based on a moving speed of the object in a period during which the object is regarded as touching the operation surface for input by the information obtained by the obtainment unit, and a determination unit configured to determine that the object is released from the operation surface in response to that the information obtained by the obtainment unit satisfies the condition set by the setting unit.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the attached drawings. It is to be noted that the exemplary embodiments described below are merely examples for implementing the present disclosure. Thus, the present disclosure is in no way limited to the following exemplary embodiments.

According to the present exemplary embodiment, a condition for determining whether an object is released from an operation surface or not is controlled according to a state of the object while touching including a change in an instruction position input with respect to an information processing apparatus 100. The object such as a user's finger and a stylus is used for inputting a touch operation. When a stereo camera or a range image sensor is used, there is a tendency that a detection error in a distance between an operation surface and a fingertip notably appears in an operation for quickly moving the fingertip, especially like a flick operation (an operation for moving the object at high speed like flicking the operation surface when releasing). Thus, according to the present exemplary embodiment, performing a flick operation is described below as an example of an operation input by a user. However, the flick operation is merely an example, and the present exemplary embodiment can be applied to processing for recognizing various operations associated with touch and release. The flick recognition processing is described in detail below. Terms "touch" and "touched state" used in the present exemplary embodiment mean that an object and an operation surface are "in a relationship close enough to be regarded as being in contact with each other" regardless of whether they are actually in contact with each other. Further, a term "touch operation" means an operation input by the object in the touched state. In other words, even if the object and the operation surface are not actually in contact with each other, a "touch operation" may be input if the object satisfies a condition of a distance close to the operation surface.

Figure 1:
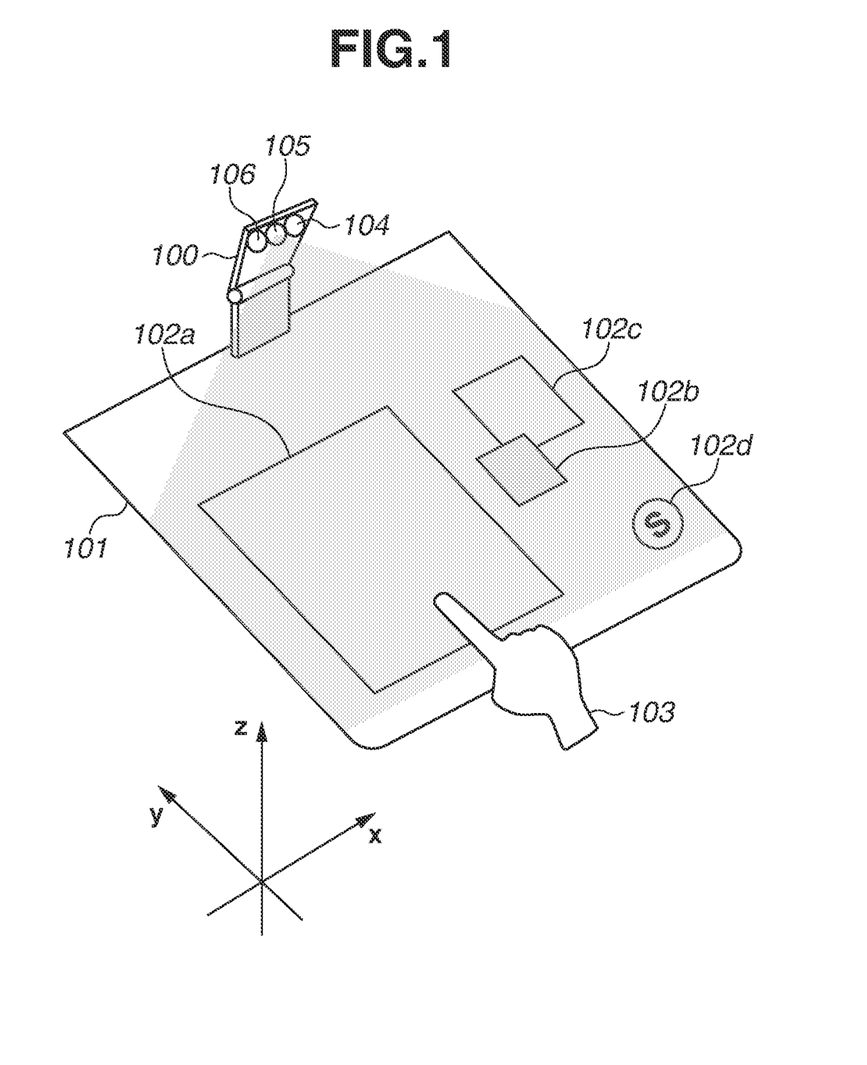
FIG. 1 illustrates a usage example of an information processing apparatus.

FIG. 1 illustrates an example of an external appearance of a system provided with the information processing apparatus 100 described according to the present exemplary embodiment. The information processing apparatus 100 irradiates projection light from a projection light irradiation unit 105 of a projector 209 and thus can set an arbitrary plane as an operation surface. In the example in FIG. 1, the information processing apparatus 100 is disposed on an operation surface 101 and projects light on a table surface. FIG. 1 includes user interface (UI) parts 102a to 102d (hereinbelow collectively described as display items), such as electronic data, buttons, and the like, projected by the projector 209 on the table surface. According to the present exemplary embodiment, a case when a user performs a touch operation using a finger 103 on the display item is described. Further, according to the present exemplary embodiment, an example when an image is projected on the operation surface 101 is described. However, the operation surface 101 may be other than a table, and for example, a wall surface may be used as the operation surface by projecting the projection light. In addition, a surface to be used as the operation surface is not necessarily a plane surface. Infrared light emitted by an infrared light emitting unit 207 is emitted from a light emitting element 104 to the projection surface, reflected by the user's finger 103 and the like, and captured as reflected infrared light by an infrared camera 208. In FIG. 1, a lens 106 is an imaging lens of the infrared camera 208. The information processing apparatus 100 performs various types of image processing on an infrared intensity image obtained by the infrared camera 208, determines a proximity state of the finger and the table surface from a measurement result of a three-dimensional position of the finger, and determines whether the finger is in the "touched state". As in the case of the infrared intensity image, an image including information corresponding to a distance in a depth direction of a three-dimensional space may be referred to as a range image. According to the present exemplary embodiment, as illustrated in FIG. 1, three-dimensional position information is handled as coordinate values by setting an x axis and a y axis to a two-dimensional plane parallel to the operation surface 101 and a z axis to a height direction perpendicular to the operation surface 101. However, the coordinate axes are not necessarily parallel or perpendicular to the operation surface if the operation surface is not a plane or depending on a positional relationship between a user and the operation surface. Even in such cases, the z axis is set to a direction for detecting a proximity relationship between a recognition target and the operation surface (a degree of distance between the two), and the x axis and the y axis are set to a direction intersecting the z axis. As used herein, the term "unit" generally refers to any combination of software, firmware, hardware, or other component, such as circuitry, that is used to effectuate a purpose.

According to the present exemplary embodiment, a case is described in which a user performs a touch operation using the finger 103 to perform an input operation on the display item. Further, according to the present exemplary embodiment, a case when projection is performed on the operation surface 101 is described as an example, however, a stylus pen and the like may be used instead of a finger, and the projection surface may be other than a table. For example, the present exemplary embodiment may be applied to a system for projecting an image on a wall surface or a whiteboard. According to the present exemplary embodiment, a method is described in which a three-dimensional position of a finger is measured using an infrared light emitting unit and an infrared camera, however, the present exemplary embodiment is not limited to the infrared light emitting unit and the infrared camera. For example, a three-dimensional position of a finger may be measured using the stereo camera or the range image sensor. Further, according to the present exemplary embodiment, the projection surface projected by the projector is regarded as a touch operation surface, however, a virtual surface on the AR space and the MR space may be regarded as the touch operation surface using a head mount display.

Figure 2A:
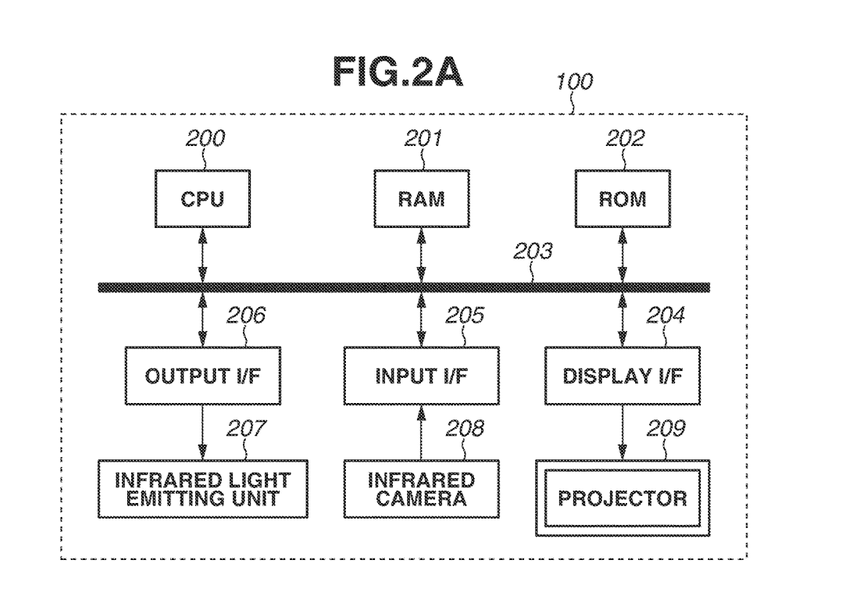
FIGS. 2A and 2B illustrate examples of a hardware configuration and a function configuration of the information processing apparatus.

FIG. 2A illustrates a hardware configuration diagram of the information processing apparatus 100 according to the present exemplary embodiment. A central processing unit (CPU) 200 performs calculation and logical determination for various processing and controls each component connected to a system bus 203. The information processing apparatus 100 is provided with a memory including a program memory and a data memory. A read-only memory (ROM) 202 is a program memory and stores control programs executed by the CPU 200. The programs include various processing procedures illustrated in the flowcharts described below. The ROM 202 stores tables. A random access memory (RAM) 201 includes a work area for the above-described programs used by the CPU 200, a data save area at the time of error processing, a load area for the above-described control programs, and the like. An operating system (OS) and various processing programs may be stored in an external storage not illustrated, and in such a case, the program is appropriately read by the RAM 201 when a power source is turned on and executed by the CPU 200.

A display interface (I/F) 204 converts information of a display screen generated in the information processing apparatus 100 to a signal which can be processed by the projector 209. An input I/F 205 receives an infrared image generated by the infrared camera 208 as an input signal and converts the received signal to information which can be processed by the information processing apparatus 100. An output I/F 206 converts an infrared light emitting command generated in the information processing apparatus 100 to a signal which can be processed by the infrared light emitting unit 207. According to the present exemplary embodiment, digital data to be projected by the information processing apparatus 100 is stored in the external storage not illustrated. The external storage may be a disk device, a flash memory, and a storage device connected via various I/Fs, such as a network and a universal serial bus (USB). The infrared image data generated by the infrared camera 208 is temporarily stored in the RAM 201, appropriately processed by the CPU 200, and discarded. However, necessary data may be appropriately stored in the external storage not illustrated. Hereinbelow, same components described with reference to the different drawings are denoted by the same reference numerals and their descriptions are not repeated.

Figure 2B:
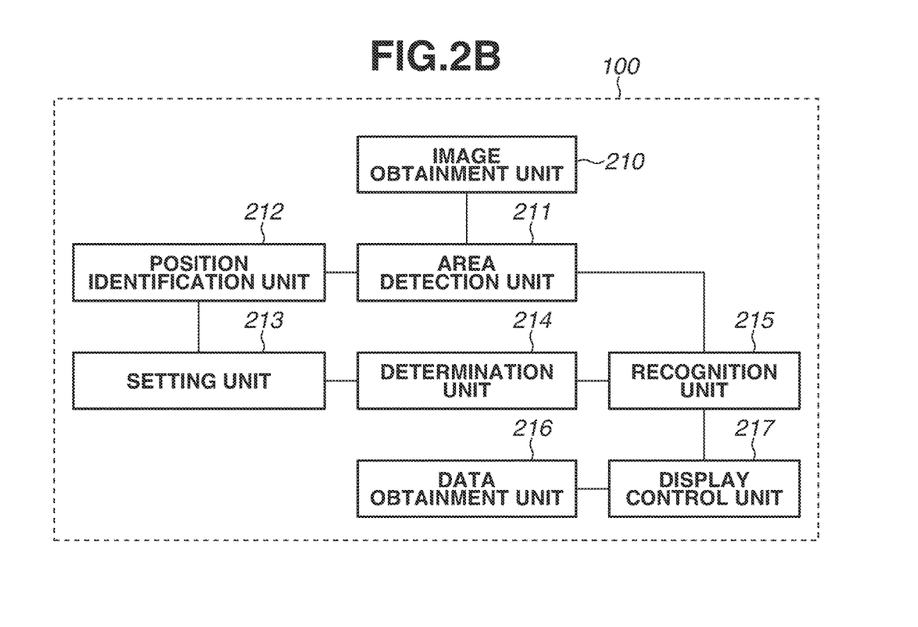

FIG. 2B is a functional block diagram of the information processing apparatus 100 according to the present exemplary embodiment.

The information processing apparatus 100 includes an image obtainment unit 210, an area detection unit 211, a position identification unit 212, a setting unit 213, a determination unit 214, a recognition unit 215, a display control unit 217, and a data obtainment unit 216. Each of these function units is realized in such a manner that the CPU 200 develops the program stored in the ROM 202 in the RAM 201 and executes processing according to each flowchart described below. Further, for example, when the hardware is configured as an alternative to software processing using the above-described CPU 200, calculation units and circuits may be configured so as to correspond to the processing by the above-described function units.

When the information processing apparatus 100 is started, the infrared light emitting unit 207 constantly emits infrared light to a same direction as a projection direction of the projector. When a user's finger enters a projection range of the projector, infrared light is reflected by a surface of the finger and captured by the infrared camera 208 as an infrared intensity image. The image obtainment unit 210 obtains the infrared intensity image captured by the infrared camera 208 and stores the image in the RAM 201 as needed. The stored infrared intensity image is processed by each function block in the information processing apparatus 100 in order.

The area detection unit 211 detects a hand area of a user by analyzing the infrared intensity image stored in the RAM 201. Further, the area detection unit 211 perform labeling on the detected hand area and stores a labeled result in the RAM 201. Details thereof are described below. The position identification unit 212 identifies three-dimensional coordinate information indicating an input position based on the hand area labeled by the area detection unit 211 and luminance of infrared reflection intensity of the infrared intensity image obtained by the image obtainment unit 210 and stores an identified result in the RAM 201. According to the present exemplary embodiment, coordinates of one point indicated by the fingertip is identified as the input position. When a stylus pen or the like is used as the object instead of a finger, a point indicated by the pen may be identified.

Figure 5A:
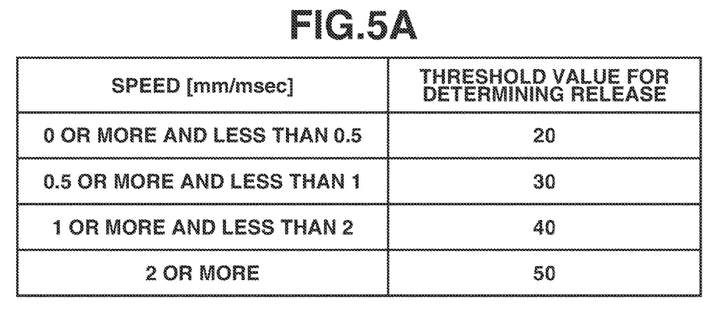
FIGS. 5A to 5D are tables of examples of release threshold values in response to user operations.
Figure 5B:
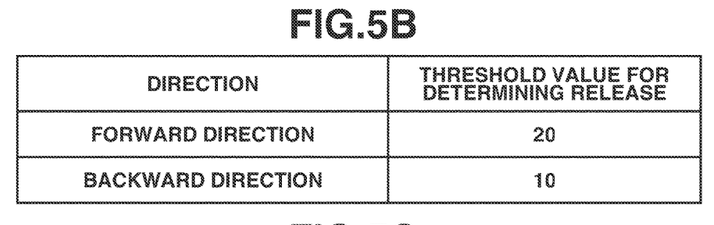
Figure 5C:
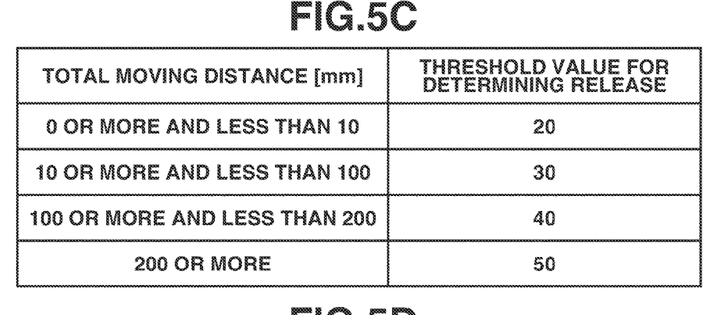
Figure 5D:
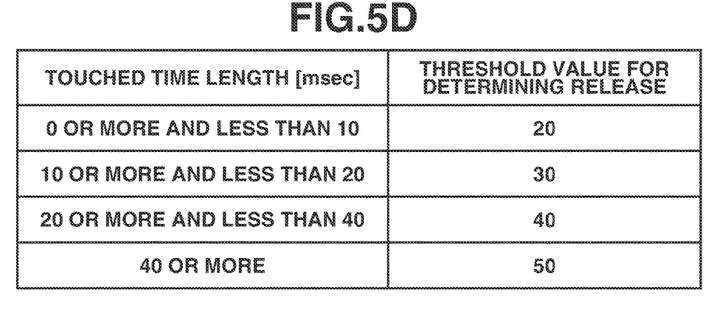

The setting unit 213 sets a condition regarding the proximity state of the object and the operation surface. The condition is used to determine whether the object is released from the operation surface based on a state of the object (i.e., a fingertip of a user in this case) while touching the operation surface. According to the present exemplary embodiment, a distance from the operation surface to the fingertip as the object, namely a threshold value of a height from the operation surface (hereinbelow, referred to as a threshold value) is set as the condition. The setting unit 213 traces the input position identified by the position identification unit 212, calculates a moving distance of the fingertip per unit time, and thus obtains a magnitude of a moving speed of the fingertip. Then, the setting unit 213 selects and sets a release threshold value corresponding to the obtained moving speed from among a plurality of release threshold value candidates according to a predetermined reference. As the predetermined reference, according to the present exemplary embodiment, a table shown in FIG. 5A is referred to. Details thereof are described below.

The determination unit 214 determines that the fingertip as the object is released from the operation surface from the three-dimensional coordinate information of the input position identified by the position identification unit 212 and the condition set by the setting unit 213 and notifies the recognition unit 215 of a determination result. According to the present exemplary embodiment, in response to that a distance from the operation surface to the fingertip which is indicated by the z coordinate of the input position becomes larger than the release threshold value, it is determined that the fingertip is released from the operation surface. Further, according to the present exemplary embodiment, in response to that the distance from the operation surface to the fingertip which is indicated by the z coordinate of the input position becomes smaller than a touch threshold value, it is determined that the fingertip touches the operation surface. The touch threshold value and the release threshold value can be the same value, however, according to the present exemplary embodiment, these threshold values are each independent values, and at least in initial values, the release threshold value is larger than the touch threshold value. This is because when a touch is detected, it is determined that the object sufficiently comes close to the operation surface, and when release is detected, it is determined that the object is sufficiently separated from the operation surface in consideration of a detection error in the z coordinate.

The recognition unit 215 recognizes a touch operation based on a determination result notified from the determination unit 214 and a moving state indicated by a change amount of the x and y coordinates of the input position. For example, when the moving speed of the input position is larger than a predetermined speed in a predetermined period immediately before release of the fingertip is detected, the determination unit 214 recognizes a flick operation. The flick operation is an operation in which the object is moved at high speed on the operation surface like sweeping or flicking, then released, and generally assigned to an inertia movement of a display image and an input of an instruction command to execute page feeding. Touch event information (touch, release, move, flick, and the like) indicating the thus recognized touch operation is notified to function units and applications, such as the display control unit 217, responding to the input. Details thereof are described below. Accordingly, repetition of determination of touch and release due to slight variation of the z coordinate of the detected input position can be prevented.

The display control unit 217 generates a display screen using electronic data that the data obtainment unit 216 obtains from the external storage and output the screen to the projector 209. According to the present exemplary embodiment, electronic data pieces are arranged on the display screen as display items (102a to 102d) as illustrated in FIG. 1. The display control unit 217 further controls the display of the display item and the display screen itself according to the touch event information input from the determination unit 214.

Figure 9A:
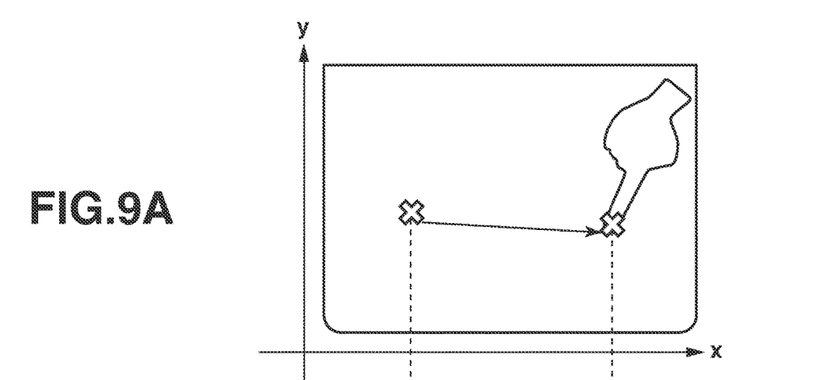
FIGS. 9A and 9B illustrate an example of a user operation.
Figure 9B:
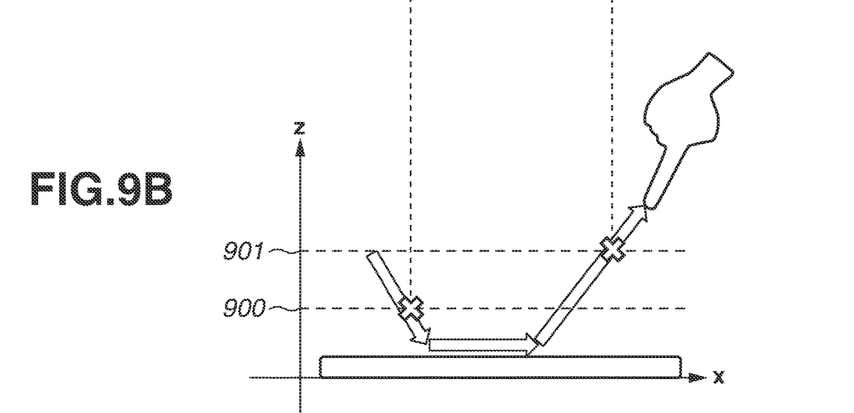

Processing processes of the information processing apparatus 100 according to the present exemplary embodiment are described in detail below with reference to flowcharts in FIG. 3 and FIG. 4 and an operation example of a user in FIGS. 9A and 9B. FIG. 9A illustrates a movement of a finger on the xy plane, and FIG. 9B illustrates a movement of the finger on the xz plane when a user performs a flick. The xy plane is a plane parallel to the operation surface, and the z axis indicates a position in the vertical direction with respect to the operation surface. In FIG. 9B, a value 900 is a touch threshold value for determining whether the fingertip touches the operation surface, and a value 901 is a release threshold value for determining whether the fingertip is released from the operation surface. According to the present exemplary embodiment, when a distance from the operation surface to the fingertip is smaller than the touch threshold value, it is identified as the touched state in which the fingertip touches the operation surface, and when a distance from the operation surface to the fingertip exceeds the release threshold value, it is identified as the released state in which the fingertip is released from the operation surface. According to the present exemplary embodiment, an initial value of the touch threshold value 900 is "15", and an initial value of the release threshold value 901 is "20".

Next, a main flow of the present exemplary embodiment is described with reference to FIG. 3. First, when a power source of the information processing apparatus 100 is turned ON, in step S300, the data obtainment unit 216 obtains data from the external storage. The display control unit 217 generates a screen in which the obtained data and UI parts are arranged, and outputs the generated screen to the projector 209. Accordingly, the screen projected from the projector is displayed on the table surface as illustrated in FIG. 1.

In step S301, the information processing apparatus 100 emits infrared light to the same direction as the projection direction of the projector. The infrared light is emitted from the infrared light emitting unit 207 installed to the information processing apparatus 100. The infrared light is constantly emitted while the power source of the information processing apparatus 100 is ON. When a user's finger or another object enters the projection range of the projector, the infrared light is reflected on a surface thereof. In this regard, an infrared light emitting range is calibrated so that the infrared light is properly reflected in an entire area in the projection range. The reflected infrared light is captured as an infrared intensity image by the infrared camera 208 installed to the information processing apparatus 100.

In step S302, the image obtainment unit 210 obtains the infrared intensity images captured by the infrared camera 208 at a predetermined frame intervals and stores the images in the RAM 201 per frame. According to the present exemplary embodiment, frames are obtained at intervals of 30 milliseconds.

In step S303, the area detection unit 211 analyzes the infrared intensity images stored in the RAM 201 and detects whether an object is entered into the projection range. According to the present exemplary embodiment, an area of a captured object is detected by performing difference (background difference) processing between an infrared intensity image when some object is captured and an infrared intensity image when only a table is captured through the use of characteristics that the reflection intensity of the infrared light differs depending on objects. According to the present exemplary embodiment, the infrared camera 208 is used for the detection of the object area, however, the infrared camera 208 is merely an example and not limited thereto. For example, the object area may be detected using the stereo camera and the range image sensor and skin color information and model information of hands.

When an object is not detected (NO in step S303), the processing returns to step S302, and the processing in steps S302 and S303 is repeated until an object is detected. Whereas, when an object is detected (YES in step S303), the processing proceeds to touch determination processing in step S304. In step S304, touch operation recognition processing is executed. Contents of the processing in step S304 are described in detail below with reference to the flowchart in FIG. 4.

When the touch operation is detected in the touch operation recognition processing in step S304, the recognition unit 215 notifies the display control unit 217 of an event indicating the touch operation, such as touch, release, move, and flick. In step S305, the display control unit 217 updates the display of the display item in the screen or the display screen itself projected by the projector 209 according to a type of the notified touch event. When the processing in step S305 is complete, in step S306, the information processing apparatus 100 determines whether the power source is turned OFF. When the power source is not turned OFF (NO in step S306), the processing proceeds to step S302, and the above-described processing is repeated every time a new object is detected. Whereas, when the power source is turned OFF (YES in step S306), the information processing apparatus 100 terminates the entire processing.

Next, the touch operation recognition processing in step S304 is described in detail with reference to the flowchart in FIG. 4.

When the processing in step S304 is started, in step S400, the area detection unit 211 determines whether the detected object area is a hand area or an area other than the hand. According to the present exemplary embodiment, the area detection unit 211 performs simple recognition of a hand shape using a size and an aspect ratio of the detected object area to determine whether the hand area or not. When the detected object area is not the hand area (NO in step S400), the touch operation recognition processing is terminated, and the processing is returned to a calling source and proceeds to step S305. Whereas, when the detected object area is the hand area (YES in step S400), the processing proceeds to step S401. On this occasion, the area detection unit 211 performs labeling on pixels corresponding to the hand area in the infrared intensity image and stores the infrared intensity image subjected to the labeling in the RAM 201.

In step S401, the position identification unit 212 identifies the hand area in the infrared intensity image based on labeling information and further identifies the x and y coordinates of the input position in the hand area. According to the present exemplary embodiment, "an average of coordinate values indicating positions at which the hand area intersects a boundary of an imaging range" is defined as coordinates indicating an entering position of the finger, and a point of the hand area farthest from the entering position is identified as the x and y coordinates of the input position (a fingertip position). The x and y coordinates of the identified input position is stored in the RAM 201.

In step S402, the position identification unit 212 obtains infrared intensity of pixels corresponding to the input position from the infrared intensity image and the x and y coordinates of the input position stored in the RAM 201. Luminance of only one pixel of the input position may cause variation in the luminance, thus, according to the present exemplary embodiment, an average of luminance of a specified pixel area including the input position is calculated as the luminance of the input position. Calculated luminance information is stored in the RAM 201.

In step S403, the position identification unit 212 converts the calculated luminance information of the fingertip into a vertical distance Lf between the fingertip and the infrared camera 208. According to the present exemplary embodiment, luminance of groups of a plurality of points of which coordinates in the space are known is measured in advance, and the vertical distance Lf is calculated from the luminance information of the fingertip placed on arbitrary coordinates. In addition, a vertical distance Lt between the infrared camera 208 and the operation surface 101 is obtained in advance, and thus a vertical distance hL (height) between the fingertip and the table can be calculated from hL=Lt−Lf.

For example, when the vertical distance Lt from the infrared camera 208 to the operation surface 101 is 1000 mm, and the vertical distance Lf between the fingertip and the infrared camera 208 is 985 mm, a distance between the fingertip and the table is 15 mm. The calculated 15 mm indicates coordinate information on the z axis of the input position. As described above, the coordinate information of the three-dimensional space (x, y, z) of the input position can be obtained by the processing up to step S403. In the subsequent flow, determination of the touch operation is performed using the information. A series of steps from step S302 to step S403 is referred to as "input position identification processing" and used in the following descriptions.

After the input position identification processing, in step S404, the setting unit 213 calculates a moving speed of the fingertip per millisecond in the xy surface. For example, when frames are obtained at intervals of 30 milliseconds, and the fingertip moves 30 mm in the x coordinate and 30 mm in the y coordinate per frame, the moving speed in the unit time of 1 millisecond is obtained as a following equation 1.

[Equation 1]

$$\frac{\sqrt{30^2 + 30^2}}{30} \approx 1.4 \qquad \text{(equation 1)}$$

Next, in step S405, the setting unit 213 sets the release threshold value according to the obtained moving speed of the fingertip and the predetermined reference. A method for setting a threshold value is described in detail with reference to FIGS. 5A to 5D. FIG. 5A is a table as an example of a plurality of condition candidates according to the moving speed of the fingertip and indicates a correspondence relationship between the moving speed and a plurality of release threshold values classified into several levels stepwise. For example, when the moving speed of the fingertip calculated in step S404 is in "0 to 0.5", the release threshold value is set to "20". Similarly, when the moving speed is in "0.5 to 1", the release threshold value is set to "30". When the moving speed is in "1 to 2", the release threshold value is set to "40". When the moving speed exceeds "2", the setting unit 213 sets the release threshold value to "50". Therefore, when the moving speed is "1.4", the setting unit 213 sets the release threshold value to "40". As described above, according to the present exemplary embodiment, when the obtained moving speed is larger than a predetermined speed, a larger release threshold value is set than that of when the obtained moving speed is smaller than the predetermined speed. In other words, it is controlled in such a manner that stricter conditions are imposed for the larger moving speed. The release threshold values set in the table are merely examples and not limited thereto.

In steps S406 to S410, the determination unit 214 determines whether the fingertip is in the touched state touching the operation surface or in the released state being released from the operation surface and notifies the result. An initial state of the information processing apparatus 100 is the released state.

First, in step S406, the determination unit 214 performs touch determination using the calculated distance hL between the fingertip and the table surface and notifies the result. More specifically, the determination unit 214 compares the distance hL between the fingertip and the table surface with the touch threshold value. When the distance hL is smaller than or equal to the touch threshold value (YES in step S406), the processing proceeds to step S409, and the state is shifted to the touched state. Whereas, when the distance hL exceeds the touch threshold value (NO in step S406), the processing proceeds to step S407. In this regard, determination of YES or NO when the distance hL is equal to the touch threshold value may be arbitrarily set together with the touch threshold value.

In step S407, the determination unit 214 performs release determination of whether the distance hL is within the release threshold value and notifies the result. When the distance hL exceeds the release threshold value (NO in step S407), the processing proceeds to step S410, and the state is shifted to the released state. When the distance hL is smaller than or equal to the release threshold value (YES in step S407), the processing proceeds to step S408.

In step S408, the determination unit 214 determines whether the last determination result is the touched state or not. If it is the touched state (YES in step S408), the processing proceeds to step S409, and the touched state is maintained. If it is not the touched state (NO in step S408), in step S410, the state is shifted to the released state. In other words, it is determined that the object is released from the operation surface, and the determination result is notified.

In step S411, the recognition unit 215 determines the touch operation based on the touched state or the released state determined in steps S406 to S410 and the x and y coordinates detected by the input position identification processing. Based on the determination, the recognition unit 215 generates the touch event, such as touch, release, move, and flick and notifies the display control unit 217 of the touch event. Then, the processing proceeds to step S305, and the display control unit 217 updates the display on the projection screen in response to the touch event. Subsequently, in step S306, when the power source of the information processing apparatus 100 is not OFF (NO in step S306), the processing returns to step S302 again, and the processing is repeated from the input position identification processing.

The processing for controlling the release threshold value in response to a user operation input to the information processing apparatus 100 according to the present exemplary embodiment has been described above. As described above, according to the present exemplary embodiment, the conditions for determining whether the operation surface is released or not are thus differentiated in response to the moving speed of the object when touching the operation surface. Especially, as the moving speed is faster, the condition for determining the release is set stricter. Therefore, according to the present exemplary embodiment, release detection accuracy can be improved even in a situation in which a detection error is easily caused by high speed movement of the object. Accordingly, recognition accuracy of the touch operation can be further improved.

Figure 10:
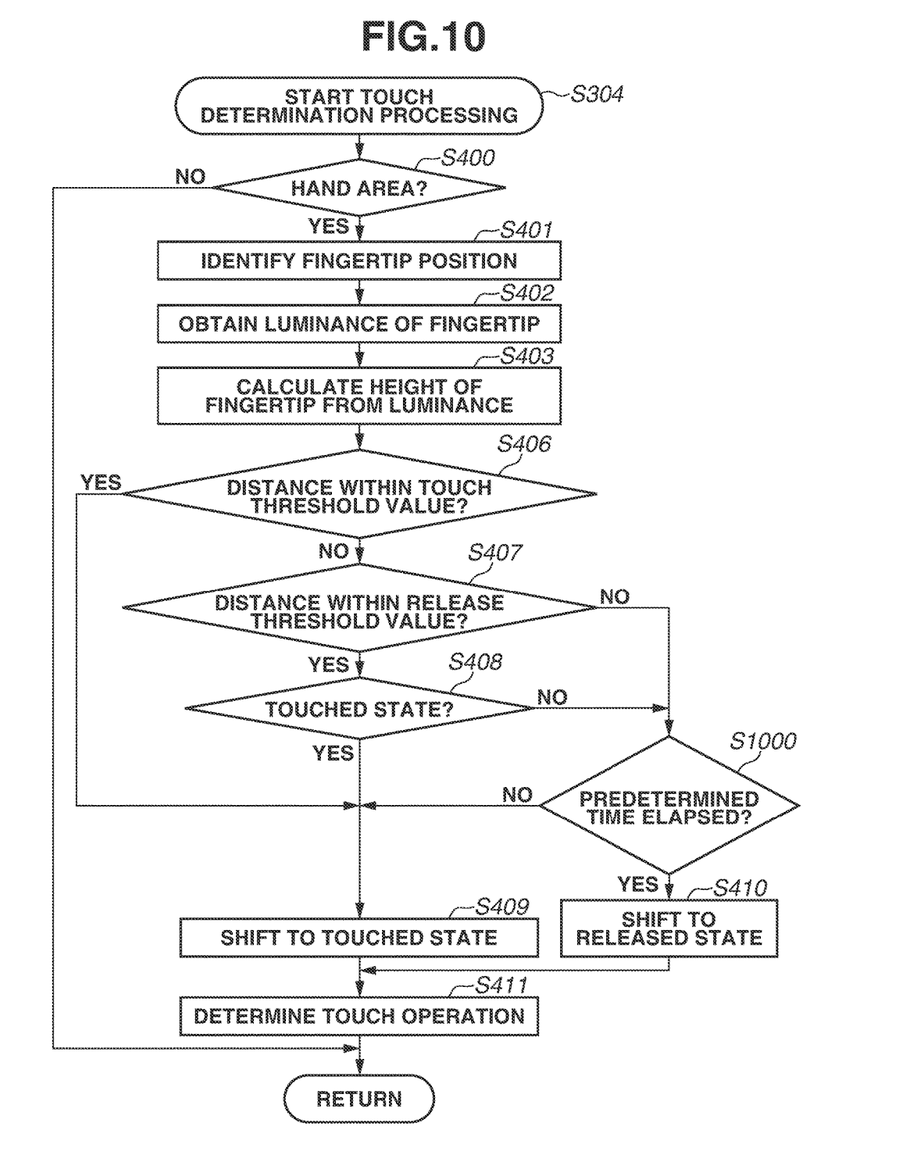
FIG. 10 is a flowchart illustrating touch determination processing.

According to the present exemplary embodiment, the release threshold value is dynamically controlled in response to the moving speed of the fingertip. However, a method for calculating the z coordinate and the like to be compared with the threshold value by fixing the release threshold value may be controlled as a condition for determining whether the object is released from the operation surface. In any method, "easiness in determination" of the release operation can be varied without causing a user to perform setting operation. In addition to that the release distance hL exceeds the release threshold value, when the relevant state (the released state)

is maintained longer than a predetermined time length, it may be determined that the object is released from the operation surface. A flowchart in such a case is illustrated in FIG. 10. The difference from the flowchart in FIG. 4 is that the processing in steps S404 and S405 is not performed in FIG. 10. In addition, the processing in step S1000 is performed immediately before shifting to the released state. In step S1000, the determination unit 214 determines whether a time period during which the release distance hL exceeds the release threshold value passes a predetermined time length. When the predetermined time has elapsed (YES in step S1000), the processing proceeds to step S410, and the state is shifted to the released state. When the predetermined time has not elapsed (NO in step S1000), the processing proceeds to step S409, and the state is shifted to the touched state. The predetermined time length for determining the released state may be a variable value specified in response to a time length during which the object touches the operation surface.

<First Modification>

According to the first exemplary embodiment, the release threshold value to be a condition for determining whether the object is released from the operation surface is set based on a highest reaching speed in the movement of the object while touching the operation surface. An example is described below as a modification in which a release speed is reset when the moving speed is decelerated after exceeding a predetermined upper limit value and slowed down below the upper limit value.

Excepting a case in which touch and release are repeatedly input more than once, like a double tap and a triple tap, when the touch operation is complete and the object is released, the object is separated sufficiently away from the operation surface, so that the release threshold value is too large and a problem rarely occurs. However, when touch and release are repeatedly input more than once, a distance that the object is moved tends to be shorter for making the operation more efficient. Therefore, if the release threshold value remains set at a larger value than a default value, and when touch and release are repeated, it may cause a case in which a user intends to release a touch but the release is not recognized. On the other hand, an operation in which touch and release are repeated is rarely input while being moved at high speed. Therefore, according to a first modification, the release threshold value is reset when the object is decelerated below the reference value, so that it becomes easier to detect release at a release timing intended by a user even in a case in which touch and release are repeated. According to the modification, the release detection accuracy can be improved in input of further various touch operations.

An external appearance of the system and a hardware configuration according to the first modification are similar to those illustrated in FIGS. 1 and 2A according to the first exemplary embodiment. Further, a function configuration of the first modification is similar to that of the first exemplary embodiment except for the setting unit 213, and thus different points are only described. The setting unit 213 according to the first modification further determines whether the moving speed of the fingertip reaches the upper limit value in addition to the processing according to the first exemplary embodiment. When the moving speed reaches the upper limit value and then is slowed down, the setting unit 213 sets the release threshold value to an initial value. The set release threshold value is stored in the RAM 201. Details thereof are described below.

Figure 3:
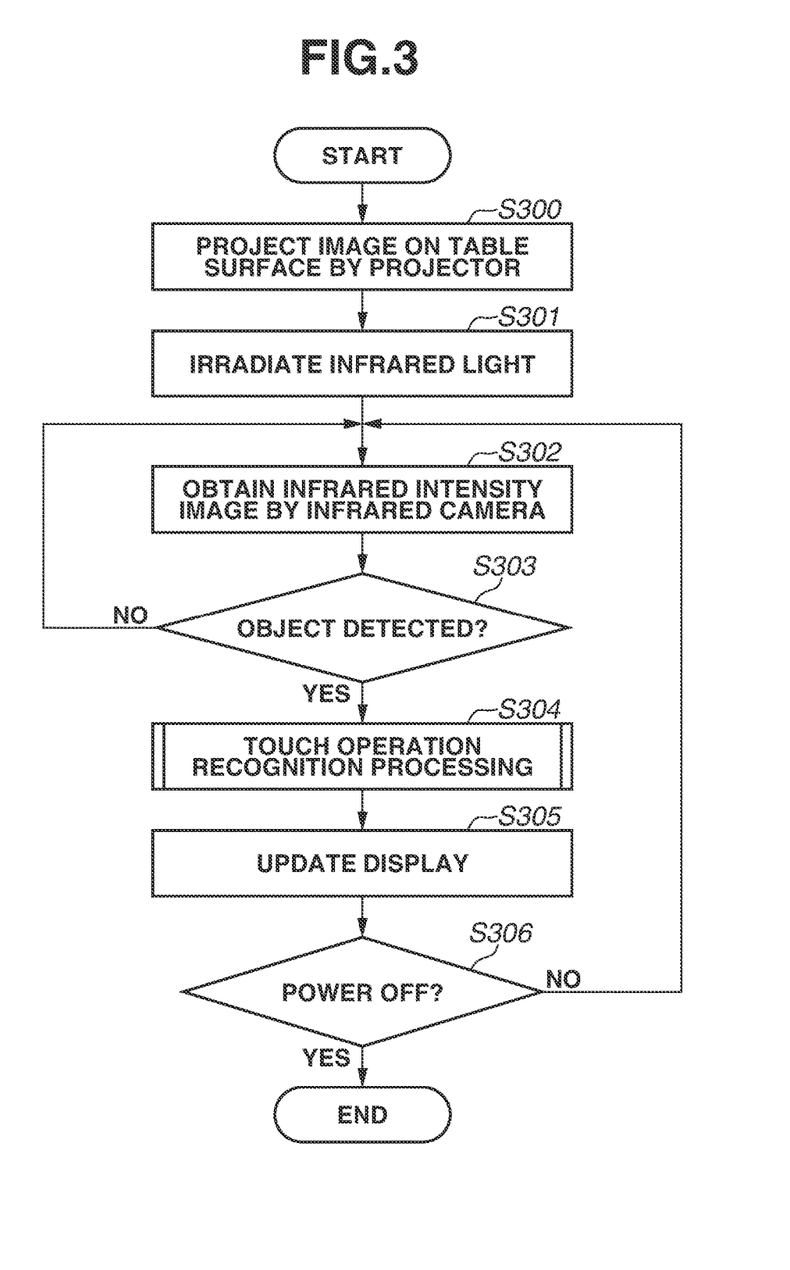
FIG. 3 is a flowchart illustrating main processing of the information processing apparatus.
Figure 4:
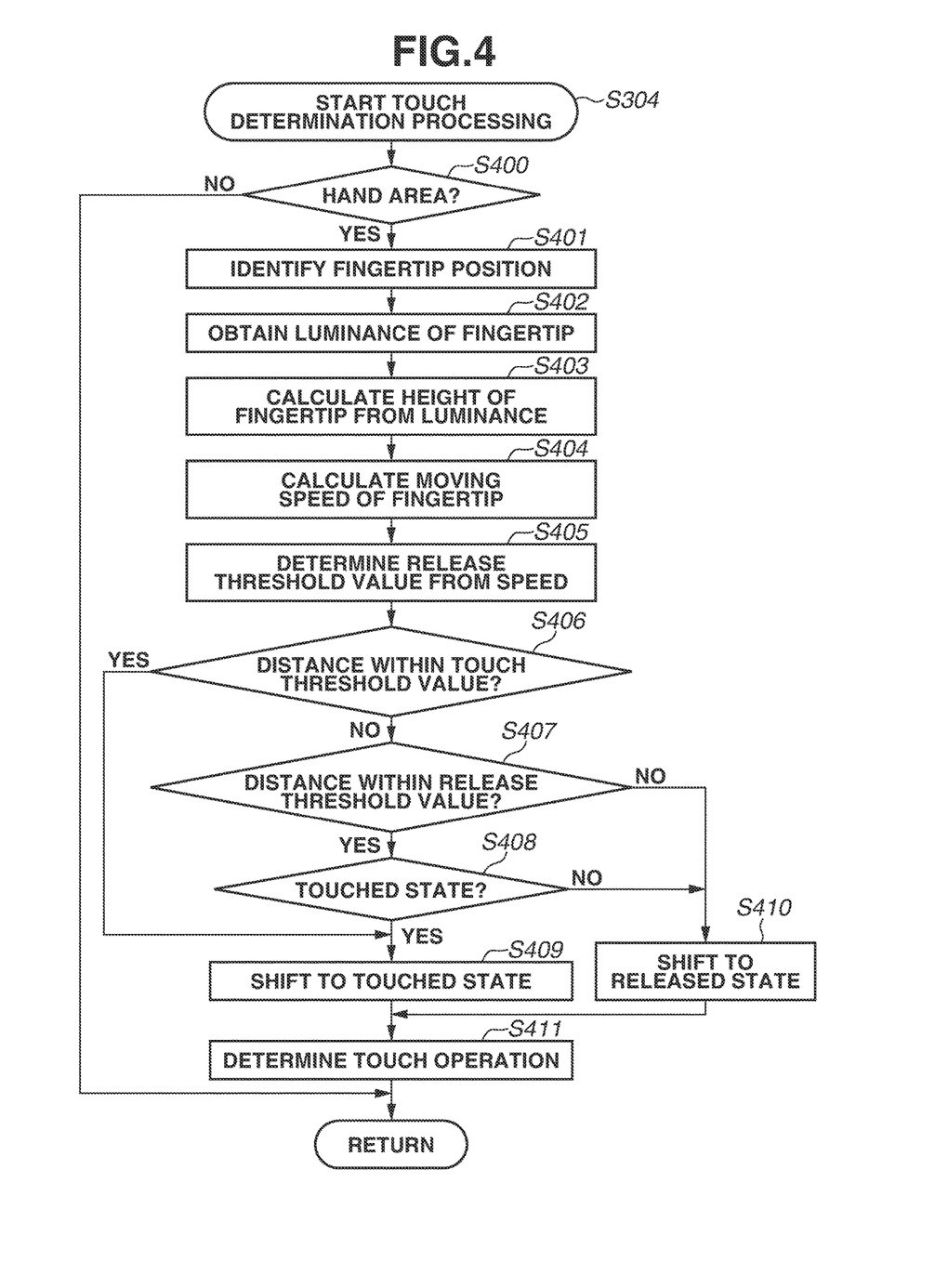
FIG. 4 is a flowchart illustrating touch determination processing executed in the main processing of the information processing apparatus according to a first exemplary embodiment.
Figure 6:
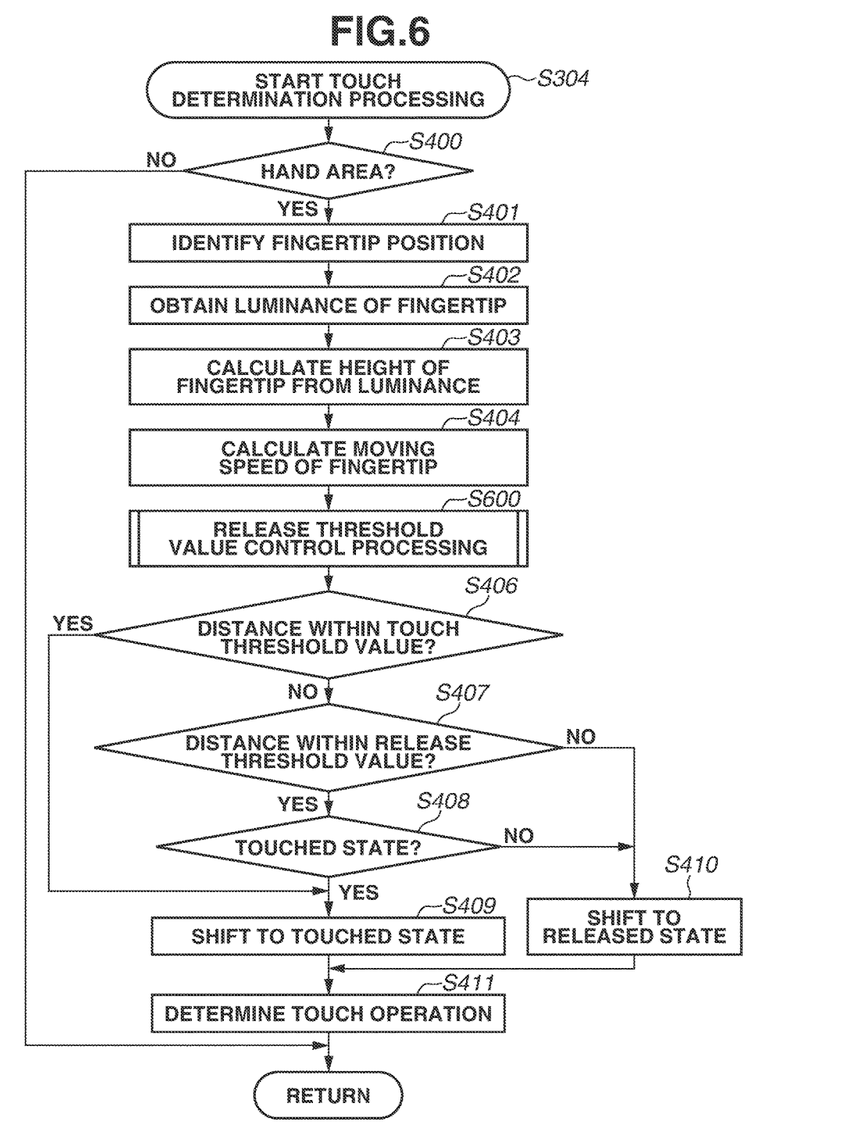
FIG. 6 is a flowchart illustrating touch determination processing executed in the main processing of the information processing apparatus according to a first modification.

The information processing apparatus according to the first modification also executes the main processing according to the flowchart illustrated in FIG. 3 as is the case with the first exemplary embodiment. However, the contents of the touch operation recognition processing in step S304 are different. FIG. 6 is a flowchart illustrating the touch determination processing according to the first modification. The processing in steps S400 to S404 are similar to those in the first exemplary embodiment. According to the first modification, the moving speed is calculated in step S404, and then in step S600, the processing is shifted to control processing of the release threshold value.

Figure 7:
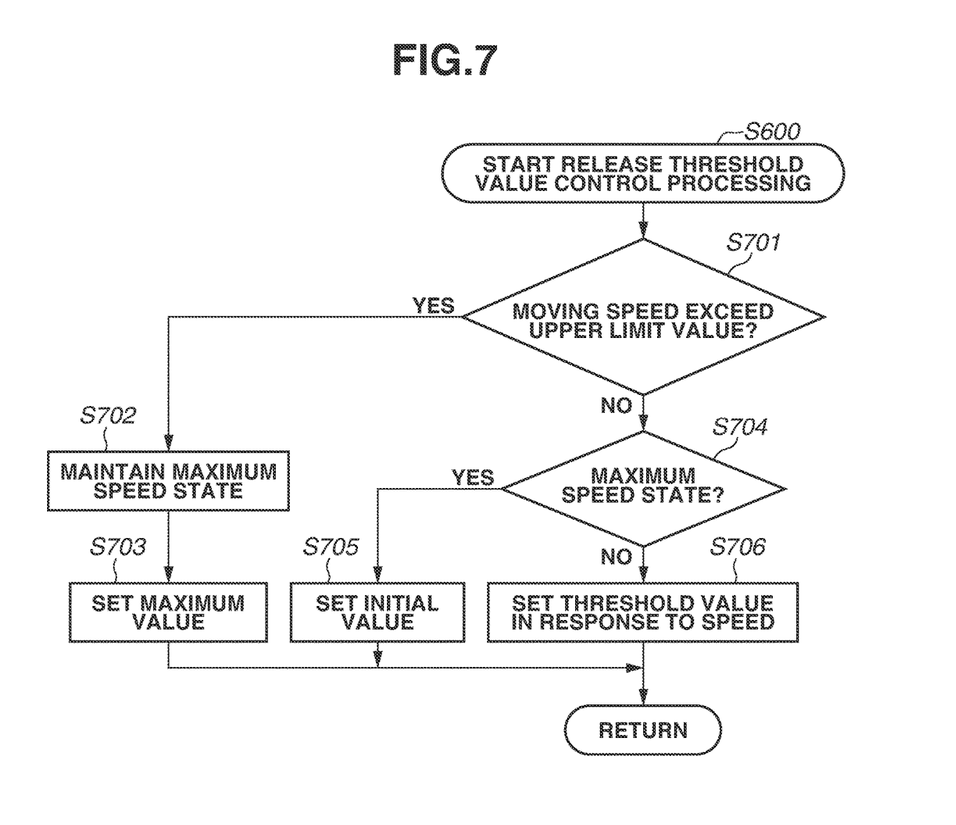
FIG. 7 is a flowchart illustrating an example of a control flow of a release threshold value.

FIG. 7 is a flowchart illustrating an example of a flow of the control processing of the release threshold value in step S600. In step S701, the setting unit 213 determines whether the moving speed exceeds the upper limit value. The upper limit value of the moving speed is for example "2" in FIG. 5A, so that the setting unit 213 determines whether the moving speed exceeds "2". When the obtained moving speed exceeds the upper limit value (YES in step S701), the processing proceeds to step S702. In step S702, the setting unit 213 sets a "maximum speed flag" to "TRUE" so as to store information indicating that a current input state is a maximum speed state, and the processing proceeds to step S703. The "maximum speed flag" indicates a state whether the moving speed of the fingertip exceeds the upper limit value, an initial value thereof is "FALSE". In step S703, the setting unit 213 set the release threshold value to "50", and the processing is returned to the calling source.

Whereas, when the obtained moving speed does not exceed the upper limit value (NO in step S701), the processing proceeds to step S704. In step S704, the setting unit 213 determines whether the last moving speed is the maximum speed with reference to the value of the "maximum speed flag". When the "maximum speed flag" is "TRUE" (YES in step S704), the processing proceeds to step S705. In step S705, the setting unit 213 sets the release threshold value to "20" as the initial value and sets the "maximum speed flag" to "FALSE", then the processing is returned to the calling source. According to the processing, since the release threshold value is set to the initial value, the condition for determining release is eased after the deceleration, and release is more easily recognized.

Whereas, when the "maximum speed flag" is "FALSE" (NO in step S704), the processing proceeds to step S706. In step S706, the setting unit 213 sets the release threshold value corresponding to the moving speed of the fingertip according to FIG. 5A as is the case with the first exemplary embodiment, and the processing is returned to the calling source. After the return to the calling source, the processing proceeds to step S406, and the subsequent processing is similar to that in the first exemplary embodiment.

According to the first modification, the release threshold value is set to the initial value in step S705, however, the initial value is an example and not limited thereto. For example, the release threshold value may be set to a predetermined value instead of the initial value. In addition, the release threshold value may be returned to the initial value in a stepwise manner rather than returned at once. In other words, the release threshold value may be set to a smaller value than that of the first exemplary embodiment. According to the first modification, the release determination condition (the release threshold value) is eased quicker than the first exemplary embodiment when the moving speed is decreased, so that a timing for recognizing the release becomes quicker. Accordingly, a recognition rate of an operation intended by a user can be improved.

<Second Modification>

According to the first exemplary embodiment, the release threshold value to be the condition for determining whether the object is released from the operation surface is set based on the moving speed of the object while touching. However, according to the present exemplary embodiment, a state of the object which can be used as a basis for changing the condition is not limited to the moving speed. According to a second modification, the condition is changed based on a moving direction of the object while touching. More specifically, when the moving direction of the object while touching is greatly changed, the release threshold value is set to a smaller value. In other words, control is performed so that release is easily recognized by easing the condition.

When the apparatus is operated by the touch operation, move operations (operation for moving the object on the operation surface while touching thereon and not accompanied with a flick at the time of release in this case) directed to different directions are repeatedly input in some cases. In such cases, a distance that the object is moved tends to be shorter for making the operation more efficient regardless of whether a user is conscious thereof, and a movement for a next input may be started while the object is distanced from the operation surface. Even if the user intends to move the fingertip after completing the N-th input, a height of the fingertip may not exceed the release threshold value, and it is likely that a move operation against the intention of the user is recognized. Therefore, according to the second modification, the release threshold value is set to a smaller value when the moving direction of the object is greatly changed, so that it becomes easier to detect release at a release timing intended by a user even in a case in which the move operations directed to the different directions are repeated. According to the modification, the release detection accuracy can be improved in input of further various touch operations.

An external appearance of the system and a hardware configuration according to the second modification are similar to those illustrated in FIGS. 1 and 2A according to the first exemplary embodiment. Further, a function configuration of the second modification is similar to that of the first exemplary embodiment except for the setting unit 213, and thus different points are only described. The setting unit 213 detects the moving speed of the fingertip according to the first exemplary embodiment. However, according to the second modification, the setting unit 213 detects the moving direction of the fingertip. Further, when the moving direction is changed, the setting unit 213 sets the release threshold value to a smaller value and stores the set release threshold value in the RAM 201.

The information processing apparatus according to the second modification also executes the main processing according to the flowchart illustrated in FIG. 3 as is the case with the first exemplary embodiment. However, the contents of the touch operation recognition processing in step S304 are different.

Figure 8:
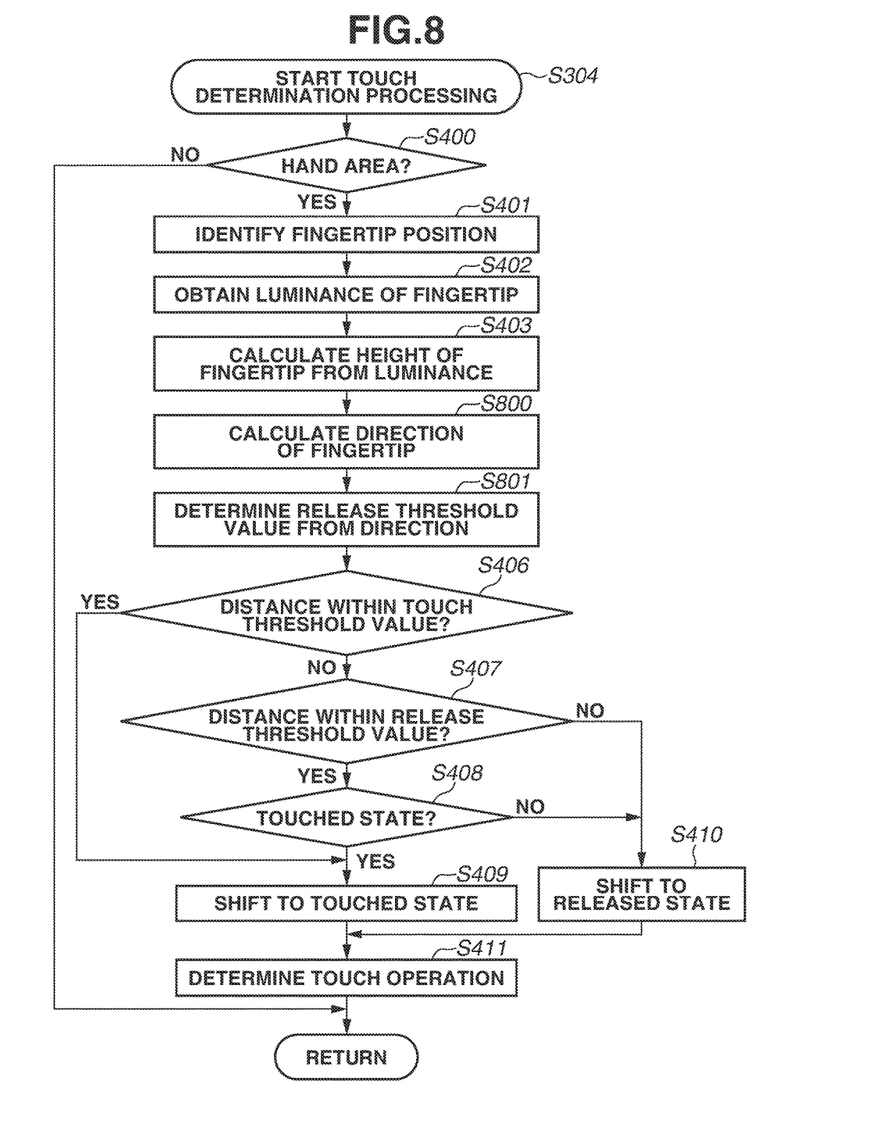
FIG. 8 is a flowchart illustrating touch determination processing executed in the main processing of the information processing apparatus according to a second modification.

FIG. 8 is a flowchart illustrating the touch determination processing according to the second modification.

The processing up to step S403 is similar to that in the first exemplary embodiment. According to the second modification, after the processing in step S403, the processing proceeds to step S800. In step S800, the setting unit 213 detects the moving direction of the fingertip, and the processing proceeds to step S801.

Detection of the moving direction is performed, for example, as below. When the fingertip in a frame 1 is at position coordinates (X1, Y1), and the fingertip in a frame 2 after 30 milliseconds is at position coordinates (X2, Y2), a moving direction $\theta$ of the fingertip from the frame 1 to the frame 2 can be expressed using a following equation 2. According to the second modification, the moving direction of the fingertip is obtained from the equation 2 and an arc tangent $\theta$.

$$\text{TAN } \theta = (X1-X2)/(Y2-Y1) \qquad \text{(equation 2)}$$

In step S801, the setting unit 213 sets the release threshold value in response to a change in the moving direction of the fingertip. Based on FIG. 5B, when it is determined as a forward direction with respect to the previous operation, the release threshold value is set to "20", and when it is determined as a backward direction with respect to the previous operation, the release threshold value is set to "10". The value set here is an example. When the moving direction becomes the backward direction, a smaller value than that of the forward direction may be set. In addition, the classification is not limited to these two, namely the forward direction and the backward direction, and may be divided into finer categories. Subsequently, the processing proceeds to step S406, and the processing similar to that in the first exemplary embodiment is performed.

As described above, according to the second modification, the release determination condition (the release threshold value) is eased in response to the change in the moving direction, so that a timing for recognizing the release becomes quicker than usual. Accordingly, the recognition rate of an operation intended by a user can be improved.

According to the present exemplary embodiment, the example using the moving direction is described as an example of a state of the object which can be used as a basis for changing the condition, however, the state is not limited to the moving direction. For example, the setting unit 213 may calculate a total moving distance after the touched state and set the release threshold value according to the total moving distance. For example, the release threshold value is set according to the table in FIG. 5C. In this case, when the total moving distance is "0 or more and less than 10", "10 or more and less than 100", "100 or more and less than 200", or "200 or more", the release threshold value is respectively set to "20", "30", "40", or "50".

The setting unit 213 may set the release threshold value according to a length of an elapsed time after shifting to the touched state, namely a time length during which the object touches the operation surface. For example, the release threshold value is set according to the table in FIG. 5D. In this case, when the touched time length is "0 or more and less than 10", "10 or more and less than 20", "20 or more and less than 40", or "40 or more", the release threshold value is respectively set to "20", "30", "40", or "50".

According to the above-described modifications, as is a case with the first exemplary embodiment, the method for calculating the z coordinate and the like to be compared with the threshold value by fixing the release threshold value may be controlled as the condition for determining whether the object is released from the operation surface. In a case where the release threshold value is fixed, it may be determined that the object is released from the operation surface when a state in which the distance hL exceeds the release threshold value (the released state) continues longer than a predetermined time length. In this case, the predetermined time length for determining the released state may be a variable value specified in response to a time length during which the object touches the operation surface.

According to the present disclosure, release detection accuracy can be improved in a touch operation recognized based on a proximity state of a predetermined object and a touch target surface without asking a user for a setting operation.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiments of the present disclosure, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-003236, filed Jan. 9, 2015, which is hereby incorporated by reference herein in its entirety.

What is claimed is:

1. An information processing apparatus comprising:
one or more memories storing instructions; and
one or more processors that, when executing the instructions, causes the information processing apparatus to:
obtain information indicating a proximity state of an object and a predetermined operation surface, based on information of sensing the predetermined operation surface from above;
set a condition regarding the proximity state for determining whether the object is released from the operation surface based on a moving speed and a release threshold value of the object in a period during which the object is regarded as touching the operation surface for input by the obtained information, wherein the release threshold value changes depending on the moving speed; and
determine that the object is released from the operation surface in response to that the obtained information satisfies the set condition.

2. The information processing apparatus according to claim 1, wherein the instructions further cause the information processing apparatus to set a condition to be set when a moving speed of the object is faster than a reference speed stricter than a condition to be set when a moving speed of the object is slower than the reference speed.

3. The information processing apparatus according to claim 2, wherein the instructions further cause the information processing apparatus to ease the condition in a case where a moving speed of the object exceeds the reference speed and then is slowed down below the reference speed again.

4. The information processing apparatus according to claim 2, wherein the condition is a threshold value of a magnitude of a degree of the proximity state, and the instructions further cause the information processing apparatus to set a threshold value to be set when a moving speed of the object is faster than the reference speed greater than a threshold value to be set when a moving speed of the object is slower than the reference speed.

5. The information processing apparatus according to claim 4, wherein the instructions further cause the information processing apparatus to obtain a threshold value corresponding to a moving speed of the object in a period during which the object is regarded as touching the operation surface for input from among a plurality of threshold values stored in advance as candidates of the condition and sets the threshold value obtained as the condition.

6. The information processing apparatus according to claim 1, wherein the instructions further cause the information processing apparatus to obtain a distance between the operation surface and the object,
set a threshold value of the distance between the operation surface and the object as the condition, and
in a case where a distance from the operation surface to the object exceeds the set threshold value, determine that the object is released from the operation surface.

7. The information processing apparatus according to claim 6, wherein, in a case where a distance between the operation surface and the object is smaller than a predetermined touch threshold value, the instructions further cause the information processing apparatus to determine as a state in which the object touches the operation surface, the predetermined touch threshold value is a value independent from a threshold value set.

8. The information processing apparatus according to claim 6, wherein, in a case where a state in which a distance from the operation surface to the object exceeds a threshold value set continues longer than a predetermined time length, the instructions further cause the information processing apparatus to determine that the object is released from the operation surface.

9. The information processing apparatus according to claim 6, wherein, in a case where a state in which a distance between the operation surface and the object exceeds a threshold value set continues longer than a time length specified in response to a time length during which the object touches the operation surface, the instructions further cause the information processing apparatus to determine that the object is released from the operation surface.

10. The information processing apparatus according to claim 6, wherein the instructions further cause the information processing apparatus to obtain information indicating the distance using an infrared image obtained by capturing an image of a space including the object.

11. The information processing apparatus according to claim 6, wherein the instructions further cause the information processing apparatus to obtain information indicating the distance using a range image obtained by capturing an image of a space including the object.

12. The information processing apparatus according to claim 1, wherein the instructions further cause the information processing apparatus to recognize a completion of one touch input in response to determination that the object is released from the operation surface.

13. The information processing apparatus according to claim 12, wherein the one touch input is a series of position information pieces of the object from a time point when the object is regarded as touched the operation surface to a time point when the object is regarded as released therefrom.

14. A method for controlling an information processing apparatus, the method comprising:
- obtaining information indicating a proximity state of an object and a predetermined operation surface, based on information of sensing the predetermined operation surface from above;
- setting a condition regarding the proximity state for determining whether the object is released from the operation surface based on a moving speed and a release threshold value of the object in a period during which the object is regarded as touching the operation surface for input by the obtained information, wherein the release threshold value changes depending on the moving speed; and
- determining that the object is released from the operation surface in response to that the obtained information satisfies the set condition.

\* \* \* \* \*